United States Patent
Marchesotti (10) Patent No.: US 8,094,947 B2
(45) Date of Patent: Jan. 10, 2012

(54) IMAGE VISUALIZATION THROUGH CONTENT-BASED INSETS

(75) Inventor: Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 904 days.

(21) Appl. No.: 12/123,511

(22) Filed: May 20, 2008

(65) Prior Publication Data

US 2009/0290794 A1 Nov. 26, 2009

(51) Int. Cl.
*G06K 9/62* (2006.01)
(52) U.S. Cl. .......................... 382/224; 382/173; 382/298
(58) Field of Classification Search .................. 382/173, 382/203, 224, 286, 291, 298
See application file for complete search history.

(56) References Cited

U.S. PATENT DOCUMENTS

| | | | |
|---|---|---|---|
| 6,009,209 A | 12/1999 | Acker et al. | |
| 6,123,362 A | 9/2000 | Squilla et al. | |
| 6,278,491 B1 | 8/2001 | Wang et al. | |
| 6,377,704 B1 | 4/2002 | Cooperman | |
| 6,434,579 B1 | 8/2002 | Shaffer et al. | |
| 6,545,743 B1 | 4/2003 | Luo et al. | |
| 7,034,848 B2 | 4/2006 | Sobol | |
| 2001/0048802 A1 | 12/2001 | Nakajima et al. | |
| 2002/0078612 A1 | 6/2002 | Meacham et al. | |
| 2003/0095155 A1* | 5/2003 | Johnson ........................ | 345/864 |
| 2004/0047519 A1 | 3/2004 | Gennart et al. | |
| 2004/0109197 A1 | 6/2004 | Gardaz et al. | |
| 2005/0141849 A1 | 6/2005 | Tsue et al. | |
| 2006/0072847 A1 | 4/2006 | Chor et al. | |
| 2006/0256134 A1* | 11/2006 | Widdowson .................. | 345/629 |
| 2007/0005356 A1 | 1/2007 | Perronnin | |
| 2007/0258648 A1 | 11/2007 | Perronnin | |
| 2008/0069456 A1 | 3/2008 | Perronnin | |

FOREIGN PATENT DOCUMENTS

| | | |
|---|---|---|
| EP | 0 755 022 B1 | 1/1997 |
| EP | 1 418 509 A1 | 5/2004 |
| WO | WO 2006/079991 A2 | 10/2007 |

OTHER PUBLICATIONS

U.S. Appl. No. 11/170,496, filed Jun. 30, 2005, Perronnin.
U.S. Appl. No. 11/524,100, filed Sep. 19, 2006, Perronnin.
U.S. Appl. No. 11/637,984, filed Dec. 13, 2006, Digby.
U.S. Appl. No. 11/767,739, filed Jun. 25, 2007, Bressan, et al.
U.S. Appl. No. 11/801,230, filed May 9, 2007, Marchesotti, et al.
U.S. Appl. No. 12/033,434, filed Feb. 19, 2008, Czurka.
U.S. Appl. No. 12/049,520, filed Mar. 17, 2008, Marchesotti, et al.
S. Avidan, et al., *Seam Carving for Content-Aware Image Resizing*, ACM Transactions on Graphics, vol. 26, No. 3, SIGGRAPH, 2007.
F. Perronnin, et al., *Adapted Vocabularies for Generic Visual Categorization*, In European Conf. on Computer Vision, (2006).

(Continued)

*Primary Examiner* — Phuoc Tran
(74) *Attorney, Agent, or Firm* — Fay Sharpe LLP (57) ABSTRACT

A method and a system for forming an inset image are disclosed. The method includes identifying a region of interest in an original image. An inset is generated, based on the region of interest. A region of low interest is identified in the original image. The inset is applied to the region of low interest to form an inset image. The region of interest is scaled differently from the inset in the inset image. The method can proceed automatically or substantially automatically, without the need for significant user input.

21 Claims, 7 Drawing Sheets

OTHER PUBLICATIONS

P.Viola, et al., *Robust Real-Time Object Detection*, $2^{nd}$ International Workshop on Statistical and Computational Theories of Vision: Modeling, Learning, Computing and Sampling, Vancouver, Canada, Feb. 2001.

J.F.LaLonde, et al., *Photo Clip Art*, ACM Transactions on Graphics (SIGGRAPH), vol. 26, No. 3, Aug. 2007.

S.Battiato, et al., *Smart Photo Sticking*, To appear in *Proceedings of the 5th Workshop on Adaptive Multimedia Retrieval*, Paris, Lecture Notes in Computer Science, Jul. 2007.

*Face Detection Using OpenCV*; http://opencvlibrary.sourceforge.net/FaceDetection.

P.Quelhas, et al., *Modeling Scenes with Local Descriptors and Latent Aspects*, in *ICCV*, (2005).

P.Carbonetto, et al., *A Statistical Model for General Contextual Object Recognition* In *ECCV*, (2004).

A.Bosch, et al., *Scene Classification via pLSA*, In *ECCV*, (2007).

J.Hays, et al., *Scene Completion Using Millions of Photographs*, ACM Transactions on Graphics (SIGGRAPH), vol. 26, No. 3, Aug. 2007.

G.Csurka, et al., *Visual Categorization with Bags of Key-Points*, In *ECCV Workshop on Statistical Learning for Computer Vision* (2004).

M.Bressan, et al., *Towards Intent Dependent Image Enhancement—State-of-the-Art and Recent Attempts*, VISAPP—International Conference on Computer Vision Theory and Applications, Barcelona, Mar. 8, 2007 (Abstract).

F.Perronnin, et al., *Fisher Kernels on Visual Vocabularies for Image Categorization*, In *CVPR*, Minneapolis, Jun. 17-23, 2007.

M.Jones, *Statistical Color Models with Application to Skin Detection*, Intl Journal of Computer Vision, vol. 46, No. 1, pp. 81-96, Jan. 2002.

\* cited by examiner

IMAGE VISUALIZATION THROUGH CONTENT-BASED INSETS

CROSS REFERENCE TO RELATED PATENTS AND APPLICATIONS

The following copending applications, the disclosures of which are incorporated herein by reference in their entireties, are mentioned:

U.S. application Ser. No. 11/524,100, filed Sep. 19, 2006, entitled BAGS OF VISUAL CONTEXT-DEPENDENT WORDS FOR GENERIC VISUAL CATEGORIZATION, by Florent Perronnin.

U.S. application Ser. No. 11/637,984, filed Dec. 13, 2006, entitled PRINTER WITH IMAGE CATEGORIZATION CAPABILITY, by Anthony Digby.

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/033,434, filed Feb. 19, 2008, entitled CONTEXT DEPENDENT INTELLIGENT THUMBNAIL IMAGES, by Gabriela Czurka.

U.S. application Ser. No. 12/049,520 filed Mar. 17, 2008, entitled AUTOMATIC GENERATION OF A PHOTO GUIDE, by Luca Marchesotti, et al.

BACKGROUND

The exemplary embodiment relates to the field of image processing. It finds particular application in connection with a method for incorporating an inset into a digital image, and is described with particular reference thereto.

In composing images, insets are sometimes employed to add visual information. An inset is a small image contained within the borders of a larger one. One reason for using insets is that the physical space for visualizing an image is often limited. This is generally the case in printed documents, such as newspapers and journals, where articles compete for space, and also in electronic documents, especially when rendered on handheld devices where display sizes are usually small. As a result, image size often has to be reduced. Thus, while the sensors used in digital cameras are increasingly allowing greater and greater amounts of image data to be acquired (typically expressed in mega pixels), much of this image data is wasted when the image is incorporated into a document. Additionally, important detail may be lost. For example, facial details, which are often of interest to a viewer, are frequently blurred.

In the press, insets have been to bring to the attention of the user, details of the image that are considered informative and that would not be easily visible in the original image, such as people's faces. The process of identifying an appropriate region of an image, resizing it, and incorporating it as an inset into a larger image is time consuming, labor intensive, and typically requires considerable skill.

The exemplary embodiment provides a system and method for generating an inset which overcome these problems, and others.

INCORPORATION BY REFERENCE

The following references, the disclosures of which are incorporated herein in their entireties by reference, are mentioned:

U.S. Pat. No. 6,434,579, entitled DYNAMIC IMAGE REPURPOSING APPARATUS AND METHOD, by Shaffer, et al., discloses methods and systems for dynamically generating an output image in any of numerous combinations of resolution, size, image coding format, color coding format, and the like based on a multi-resolution representation of an original image.

U.S. Pub. No. 2002/0078612, entitled SYSTEM AND METHOD OF CONSTRUCTING A PHOTO ALBUM, by Meacham, et al., discloses a method of constructing a photo album, which includes generating a sticker sheet of reduced resolution thumbnail images from digital images, reading selected thumbnails from the sticker sheet with a scanner, and constructing a photo album from the digital images represented by the selected reduced resolution images.

U.S. Pat. No. 6,123,362, by Squilla, at al., entitled SYSTEM AND METHOD OF CONSTRUCTING A PHOTO COLLAGE, discloses constructing a photo collage in which a plurality of digital images are provided in a low resolution format on sticker sheets. The sheets have a unique identifier that cross references the reduced resolution digital images with a high resolution version that is stored in a database. The low resolution image stickers are arranged in a desired manner on a page layout form prior to retrieving the corresponding high resolution version of the images stored in the database.

Shai Avidan, Ariel Shamir, "Seam Carving for Content-Aware Image Resizing" *ACM Transactions on Graphics*, Volume 26, Number 3, SIGGRAPH 2007, relates to a method in which images are retargeted by adapting them for display at different sizes and/or aspect ratios, by combining non interesting background regions.

BRIEF DESCRIPTION

In accordance with one aspect of the exemplary embodiment, a method of forming an inset image includes receiving an original image, automatically identifying a region of interest in the original image, generating an inset based on the region of interest, automatically identifying a region of low interest in the original image, applying the inset on the region of low interest to form an inset image, and outputting the inset image. The region of interest is scaled differently from the inset in the inset image.

In accordance with another aspect of the exemplary embodiment, a system for forming an inset image includes a classifier for automatically assigning a class to an original image based on content, the class being selected from a plurality of classes. A first detector automatically identifies a region of interest in the original image based on the assigned class. A second detector identifies a region of low interest in the original image. An inset generator generates an inset based on the region of interest. An inset applier applies the inset on the region of low interest in the original image or an image generated therefrom to form an inset image. Optionally, an inset modifier modifies the inset image based on a user's selected modifications to the inset image.

In accordance with another aspect of the exemplary embodiment, a method of forming an inset image includes automatically assigning an object class to an original image from a plurality of predefined object classes, automatically identifying a region of interest in the original image based on the assigned object class, generating an inset based on the region of interest, automatically identifying a region of low interest in the original image, applying the inset on the region of low interest to form an inset image. The method includes scaling at least one of the original image and the inset such that the region of interest is scaled differently from the inset in the inset image.

DETAILED DESCRIPTION

A system and method are disclosed for generating insets in a substantially or completely automated manner. The method enables an improvement in the visualization of an image when rendering space is limited and the image has to be resized.

In one embodiment, the method includes classifying the image and based on extracted information and assigned class, regions of potential interest are detected and localized. An appropriate region is selected. A scaling factor is determined based on dimensions of the original image and the available rendering space. A candidate inset containing the selected region is cropped from the original image and rescaled. Finally, the inset is overlaid or otherwise applied on a region of low interest in the original, optionally resized image to generate what is referred to herein as an "inset image", i.e., an image incorporating, within its borders, an inset, smaller image.

One advantage of the exemplary method is that it enables a region of low interest to be replaced with an area of higher interest. Another advantage is that viewers are able to appreciate salient image details at higher resolution than in the original image.

The exemplary system and method may be fully automated or allow for a certain amount of user input. As used herein, a user can be any person accessing the system, such as a photographer who generated the image, an operator of a print shop, or a person interacting with a workflow in which the image is being processed to form a document, or the like.

Figure 1:
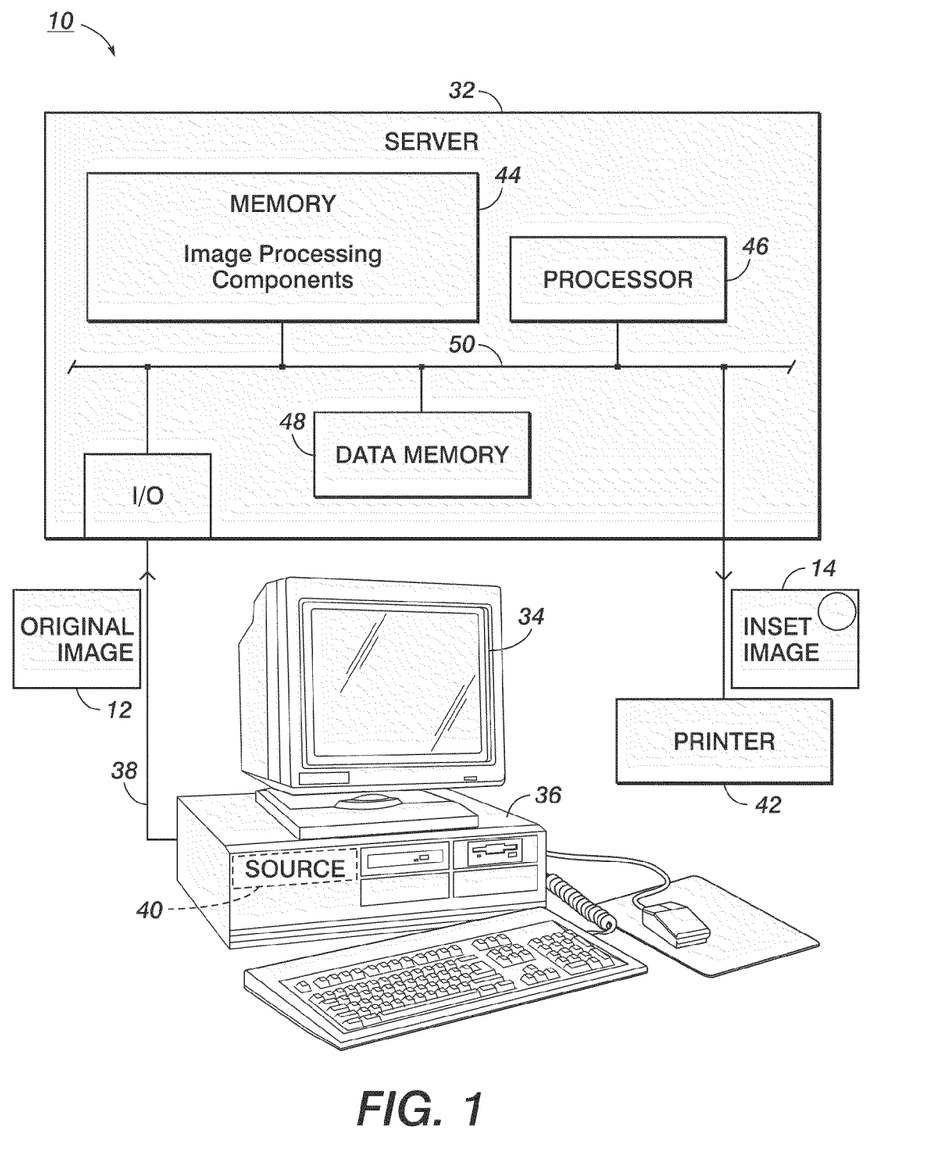
FIG. 1 is a functional block diagram of a system for generating an inset and incorporating the inset into an image in accordance with one aspect of the exemplary embodiment.
Figure 2:
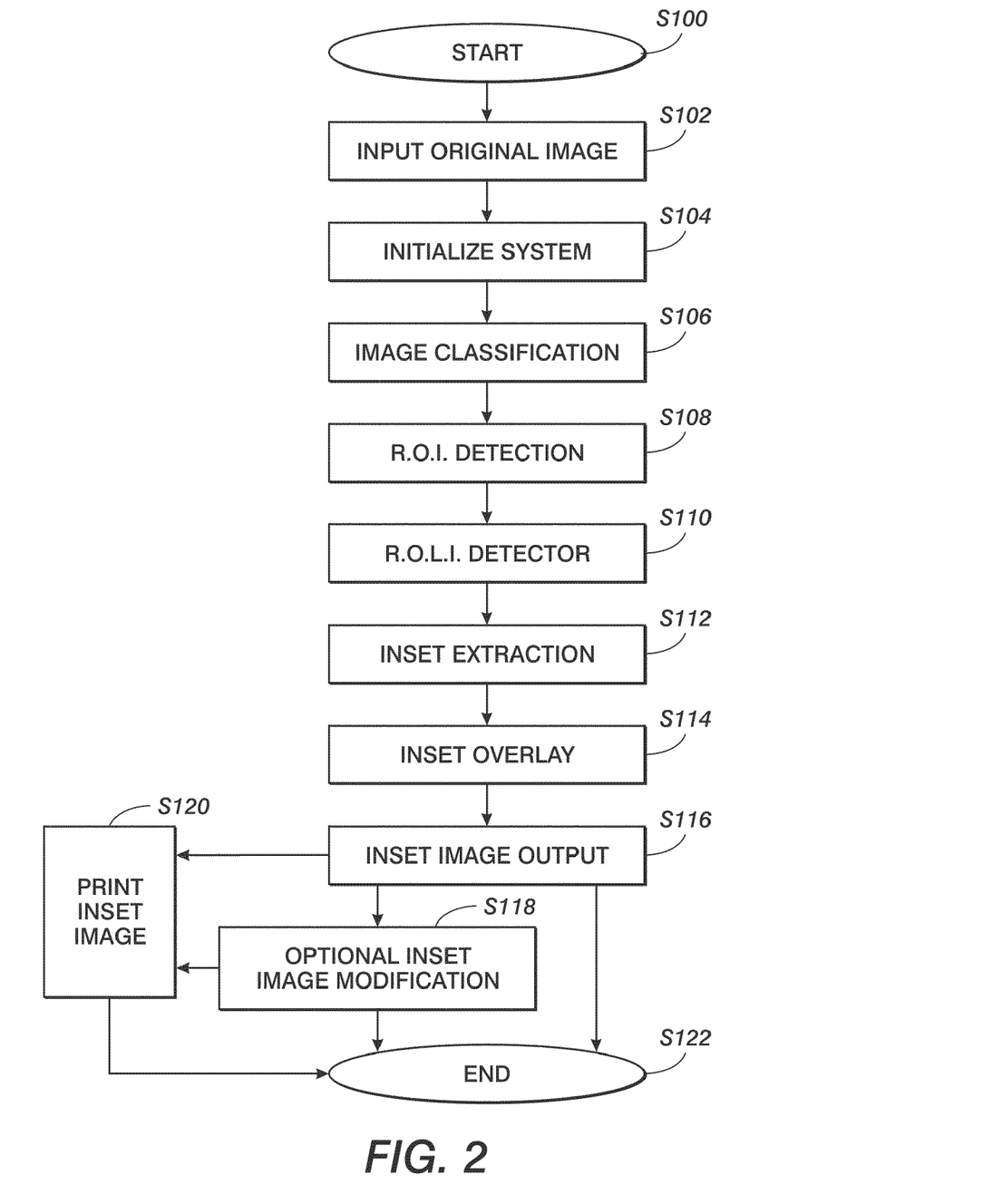
FIG. 2 is a flow diagram illustrating a method for generating an inset and incorporating the inset into an image in accordance with another aspect of the exemplary embodiment, which may be performed with the apparatus of FIG. 1.

FIG. 1 illustrates an exemplary automated image processing system 10 which may be used in performing the exemplary method described herein with reference to FIG. 2. The system 10 receives, as input, image data comprising an original image 12, such as a photograph, scanned image, or the like, and outputs an inset image 14 derived therefrom. In general, an acquired original image 12 to be processed by the system 10 is input in digital form. If not already in digital form, the image may be converted to digital form prior to processing.

Typically, each input digital image 12 includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single image data channel, however expressed (e.g., RGB, YCbCr, etc.). The images may be photographs which are received in JPEG, GIF, JBIG, BMP, TIFF or other common file format used for images and which may be converted to a suitable format for processing.

Figure 3:
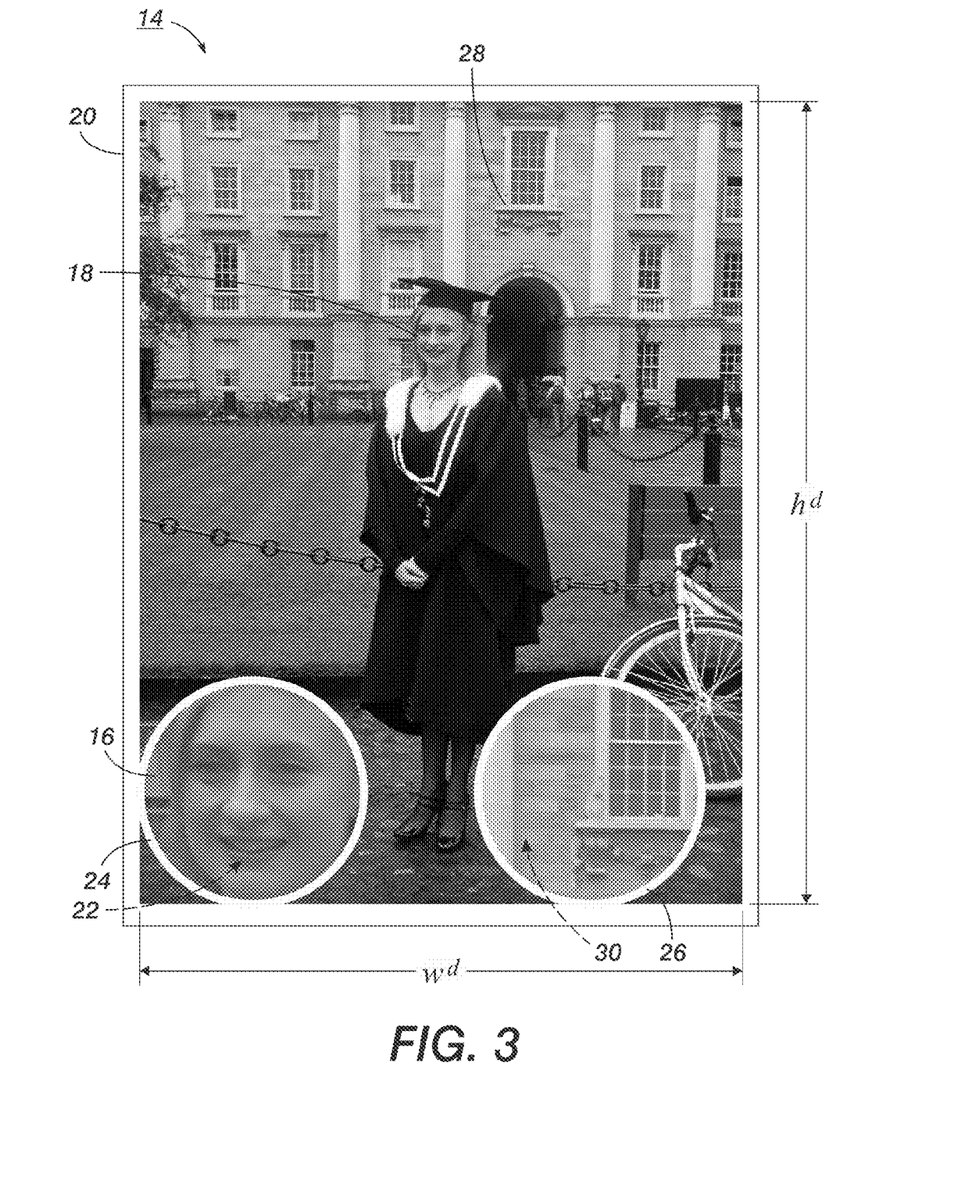
FIG. 3 illustrates an exemplary inset image with two insets, which may be generated by the method of FIG. 2.

As illustrated in FIG. 3, an exemplary inset image 14, which may be generated by the system 10, comprises an inset 16 and a corresponding region 18 within its perimeter 20. The region 18 and the inset 16 are both derived from the same original image data, i.e., from the same region of interest of the original image 12 (here a photograph of a person). Thus, for example, it can be seen that inset 16 corresponds to part of the face which is also shown in region 18.

In the exemplary embodiment, the inset 16 is a substantial duplicate of the corresponding region 18, other than that the region 18 and inset are scaled differently vs. the original image (different sizes) and thus can be of different resolutions. It is to be appreciated that while the inset is derived from the region of interest, processing operations may be performed on the image data in generating the inset 16 therefrom (e.g., color balance, sharpness, exposure, etc). Additionally, while in the exemplary process, the original image remains substantially unchanged prior to applying the inset (other than in scaling), it will be appreciated that various processing operations may be performed prior to applying the inset (e.g., color balance, sharpness, exposure, etc), and that for convenience, the term "original image" is intended to encompass an image which has undergone such processing operations.

The inset 16 is positioned in a region 22 of image 14, which is determined to be of low interest. Low interest region 22 is generally spaced from region 18. The inset 16 may be set apart from the rest of the image 14, for example, by partially or entirely surrounding it with a border 24 of a contrasting color, here shown with a white border. In other cases, e.g., where the inset is very different in color from low interest region 22, no border may be needed. The inset may assume any desired shape. The shape may be regular, such as a circle, ellipse, polygon, e.g., square or rectangle, or may be irregular, such as an irregular polygon or the approximate shape of a person's head.

The illustrated inset image 14 contains two insets 16, 26, each containing image data derived from a different respective region 18, 28 of the original image. The insets are placed in a respective region of low interest 22, 30. As will be appreciated, the number of insets is not limited to one or two. In practice however, an inset image 14 may be too confusing to the viewer if it contains multiple insets. Additionally, as each inset 16, 26 is larger in its dimensions than the corresponding low interest region 22, 30 of the inset image 14 over which it is laid, there is a practical limit to the number of insets which can be incorporated into the inset image. As discussed below, the user may be permitted to select one or more of the insets 16, 26 proposed by the system 10, in which case, other insets are automatically removed. The user may also be permitted to move a selected inset, e.g., from a current position to the position of another inset which is to be removed. In one embodiment, the system 10 is self limited to a maximum of one or two insets.

Returning now to FIG. 1, the exemplary system 10 is hosted by a computing device 32, which may be linked to a display 34, such as a user's screen. The computing device 32 may comprise one or more general purpose or dedicated computers, e.g., a desktop or laptop computer, palmtop device, PDA, server, or combination thereof. In the exemplary embodiment, the system 10 is hosted by a server 32 and accessed using a web browser on the user's device 36, e.g., via a wired or wireless link 38 between the device 36 and the server 36, such as a local area network or a wide area network, such as the Internet. In another embodiment, system 10 is incorporated into a workflow system, such as a print path, which may be resident, for example, on a digital front end of a printer or linked thereto. In another embodiment, the system 10 may be resident on a user's computer. In various embodiments, the user may be provided with the opportunity to accept, reject, or modify a proposed inset image 14 generated by the system 10. In other embodiments, the system operates fully automatically, without user input.

The system 10 may be linked to a source 40 of digital images, which provides an original image 12 to the system. In one embodiment, an original image is received by the system 10 in electronic form via the Internet. In other embodiments, the image 12 may be transferred to the system from a disk or other tangible recording medium or from memory associated with a workflow system. The original image 12 may be processed by the system and the inset image 14 output in electronic form or rendered in tangible media. For example, as illustrated in FIG. 1, the exemplary system is linked to a printer 42, such as a xerographic or inkjet printer, which renders the inset image 14 on print media, such as paper, using colorants, such as inks or toners.

The exemplary image processing system 10 may be embodied in hardware, software, or a combination thereof. In the exemplary embodiment, the system 10 may comprise image processing components in the form of software instructions, stored in the computing device's memory 44, which are executed by an associated processor 46. Input images 12, while undergoing processing, may be stored in data memory 48, which may be the same as memory 44 or a separate memory. Components of the system may communicate via a data/control bus 50.

The memory 44, 48 may represent any type of computer readable medium such as random access memory (RAM), read only memory (ROM), magnetic disk or tape, optical disk, flash memory, or holographic memory. In one embodiment, the memory 44, 48 comprises a combination of random access memory and read only memory. In some embodiments, the processor 46 and memory 44 may be combined in a single chip.

Figure 4:
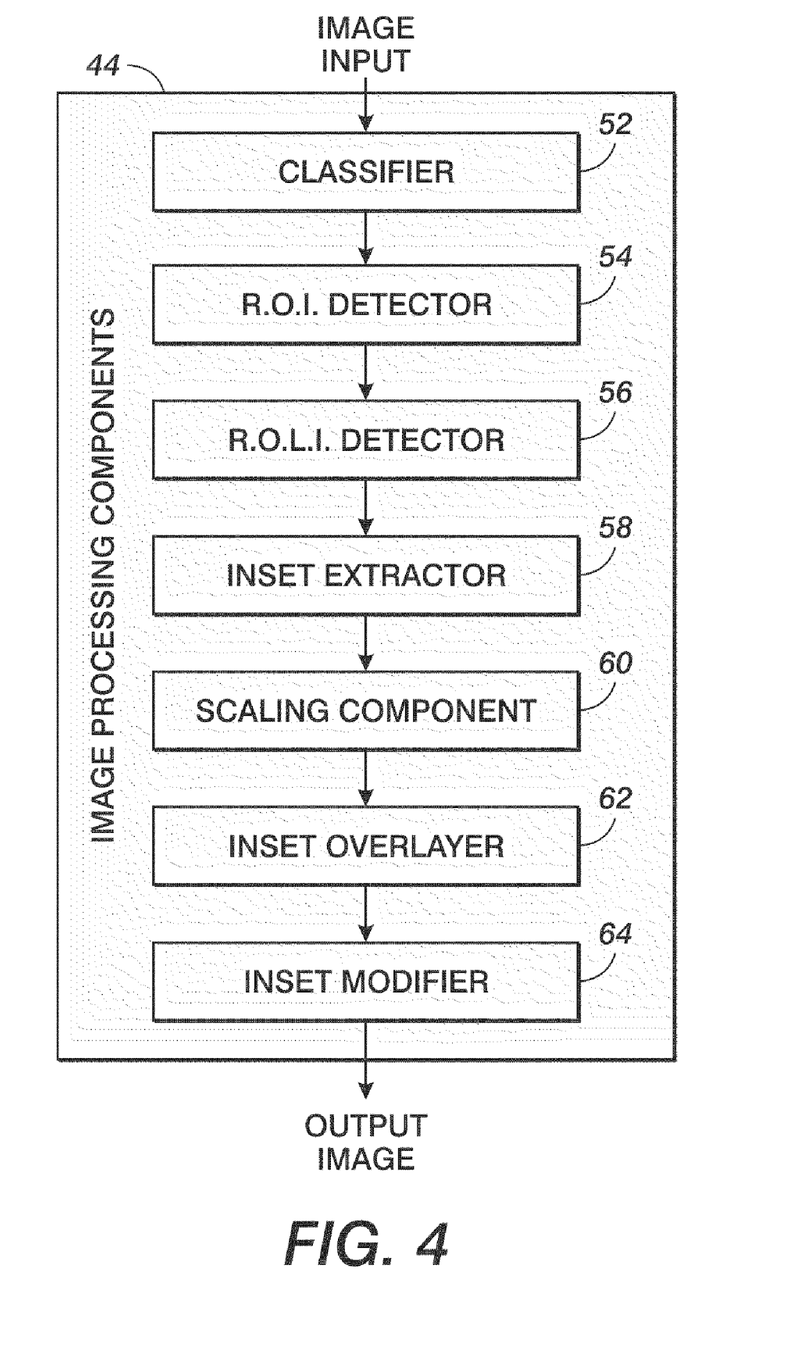
FIG. 4 illustrates software components of the exemplary system of FIG. 1.

As illustrated in FIG. 4, the system 10 may include various image data processing components including an image classifier 52, for assigning an object class to the image selected from a set of predefined object classes, a region of interest (ROI) detector (first detector) 54, for detecting one or more regions of interest based on the assigned object class, a region of low interest (ROLI) detector (second detector) 56, for identifying regions of low interest, an inset extractor 58, for forming an inset based on the image data of the identified region of interest, a scaling component 60, for applying a scaling factor to the original image and/or inset such that the ROI and inset are scaled differently from each other in forming the inset image, an inset applier 62, for applying the inset to an appropriate ROLI, and an inset image modifier 64, for modifying the inset image based on user input modifications. These components may operate on the image 12 generally in the sequence shown. As will be appreciated, these components may each be embodied in software or hardware or a combination thereof. While the illustrated components are software components located in the same memory, it is also contemplated that the components may be distributed over one or more computer devices. Components 52, 54, 56, 58, 60, 62 and 64 are best understood with respect to the exemplary method of generating an inset image, which will now be described.

FIG. 2 illustrates an exemplary image processing method which may be performed with the system shown in FIG. 1. Briefly, the method scales the input image 12 in accordance with a predefined factor and modifies the structure of the image with one or more insets 16, 26 containing regions of interest. The method need not proceed in the order illustrated and may include fewer, more, or different steps.

The method begins at S100. At S102, an image 12 (or images) to be processed is input to the system 10 and may be stored in temporary memory 48.

At S104 (initialization), the desired size of the final image is specified. Optionally, content preferences are also input at this stage.

At S106 (classification), an object class is assigned to the image. The image may be automatically classified, e.g., based on its content. Alternatively, the image may be manually classified.

At S108, (ROI detection), the image is processed to detect and localize one or more potential regions of interest (ROI's) for the intended viewer.

At S110 (ROLI detection), the image is processed to detect and localize one or more regions of low interest (ROLI).

At S112 (inset extraction), one or more of the identified ROI's is selected, either manually or automatically, and a suitably shaped crop from the selected ROI is resized accordingly to an appropriate scale factor.

At S114 (inset overlay), the inset is overlaid or otherwise applied in the ROLI.

At S116, the inset image is output.

Optionally, at S118, the inset image may be presented to the user and user input modifications incorporated.

Optionally, at S120, the inset image may be printed/incorporated into a document for printing. In one embodiment, the inset image is incorporated into a document, such as a newsletter, journal article, newspaper article, direct mail letter, advertisement, or the like, and may be rendered in tangible media, for example by printing, or displayed, e.g., on a screen.

The method ends at S122.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for generating an inset image.

Further details of the system and method now follow.

Image Input

In this step, an original image 12 is input and may be stored in memory 48 during processing. Where the user is interacting with the system 10 via a web browser, the user may click on an icon for generating an inset image and select an image to be processed. In a workflow system, the image to be modified may be previously selected and accompany a document into which it is to be incorporated. The image may be input in any convenient form, e.g., JPEG, GIF, BMP, TIFF, or the like. The image may be converted to a suitable form for processing.

Optionally, content preferences are also input at this stage. For example, the image may be accompanied by metadata or other information from the source which may be used to determine content preferences. For example, the content preferences may specify that the content of interest is male/female features, for example, because the intended viewer is female/male.

In the exemplary embodiment, the inset is generated from image data derived from the original image, i.e., the method does not require any images other than the one being modified. However, in other embodiments, the inset may be overlaid over a different image.

Initialization

At S104, the desired size of the final image is specified.

In this first step, the method is initialized with the input image and two parameters indicating the width and the height of the final image. The size of the input image is recognized from the image data, i.e., its height $h^o$ and width $w^o$, which may be expressed in terms of the number of pixels. The method is activated when the following conditions are satisfied:

$$\frac{h^o}{w^o} = \frac{h^d}{w^d}, h^o \cdot w^o \geq h^d \cdot w^d$$

where $h^o$, $w^o$ and $h^d$, $w^d$ are the width and the height of the original and destination (output) images, respectively. For example, the destination image dimensions may be defined by the area allotted to the image in a document into which it is to be incorporated. These preliminary tests ensure that the proportions between width and height in the input and output image are preserved. They also ensure that a down scaling of the input image is being performed or that the output image is to be the same size as the original image. A scaling factor S is then determined:

$$s = \frac{h^o \cdot w^o}{h^d \cdot w^d}$$

The scaling factor indicates how much the original image has to be reduced to achieve the desired dimensions. The scaling factor can be $\leq 1$.

Classification

At S106, the image may be automatically classified to understand its content. Image categorization or classification is used herein to mean the assignment of an image to one of a plurality of predefined categories or classes (i.e., a mapping that assigns labels to observations). Each category may represent different classes of objects (e.g., portrait, landscape, architecture, sport, trees, cars, animals, etc.) at different levels of generality or specificity (e.g., for the general category of animals, subclasses of cats, dogs, etc.). Based on the classification, a class-specific ROI Detector can be chosen.

Various classifiers have been developed for categorizing an image according to content, such as those employing neural networks, support vector machines, or the like. In one embodiment, the classifier 52 is a generic visual classifier (GVC), such as the Xerox Generic Visual Categorizer (GVC) (See, for example, Perronnin, F., Dance, C., Csurka, G., and Bressan, M., "Adapted Vocabularies for Generic Visual Categorization," in *European Conf. on Computer Vision*. (2006)). By generic, it is meant that the classifier is able to place the image in one of a set of classes, rather than provide a simple binary class decision for a single class. For example, the classifier may be one which has been trained to detect the following categories: Portrait, Close-Up Faces, Golf, Pets, Flowers, Snow, Mountains, Beach, Urban-day, Sunrise-Sunset, Urban-night, Crowd. However, the system is not limited to this set of classes and indeed, the set of classes may be tailored to the type of images that are expected to be processed.

In the exemplary embodiment, the classifier 52 may label patches (small regions) of an image based on semantic content, for example, by generating low level features, such as a features vector, one for each patch. Fisher kernels may be used to identify the low-level features. Based on the extracted low level features, higher level image content features for the image are identified.

In one embodiment, the classification includes a bag of visual word (BOV) based approach. In this approach, the image is first characterized by a histogram of visual word counts. The visual vocabulary is built automatically from a training set of images. To do this, some image descriptors are extracted from the image. Those descriptors are generally based on texture, color, shape, structure, or their combination and are extracted locally on patches of the image. The patches can be obtained by image segmentation, by applying specific interest point detectors, by considering a regular grid, or by or simply random sampling of image patches. For example, Scale Invariant Feature Transform (SIFT) descriptors may be computed on each patch.

Given a new image 12 to be classified, it is processed in a similar way and assigned to the most probable class, based on its features. For example, in the case of the BOV approach, each feature vector is assigned to its closest visual word in the previously trained vocabulary or to all visual words in a probabilistic manner in the case of a stochastic model. The histogram is computed by accumulating the occurrences of each visual word. Finally, the histogram is fed to one or a set of classifiers, for example K nearest neighbor, probabilistic latent semantic classifiers. The classifier may analyze the entire image or focus on objects within the image.

Further details of exemplary categorization techniques which may be used herein are to be found in U.S. application Ser. Nos. 11/524,100, and 11/170,496 to Perronnin, and U.S. Pub. Nos. 2007/0005356, 2007/0258648, and 2008/0069456, the disclosures of which are incorporated herein in their entireties by reference, and in the following references: Csurka, G., Dance, C., Fan, L., Willamowski, J., and Bray, C., "Visual Categorization with Bags of Key-points," in *ECCV Workshop on Statistical Learning for Computer Vision* (2004); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004); and Bosch, A., Zisserman, A., and Munoz, X., "Scene Classification via pLSA." in *ECCV* (2007).

If all the images are known to be in the same class, the classification step may be omitted. Alternatively, a manual classification may be performed.

In some embodiments, the class and/or ROI detectors employed is based at least in part on the expected interest of the viewer, e.g., the recipient of a direct mail document.

ROI Detection

At S108, the image is processed to detect and localize a list of one or more potential regions of interest (ROI's) for the viewer. In particular, the ROI detector takes as input the original image and extracts a list of regions of potential interest for the viewer. In this step, a list of ROIs{r=1, ..., R} may be detected with variable size $d_r$. The locations of the ROIs may be specified by their x,y pixel coordinates in the original image, e.g., the coordinates of a central pixel, or a set of pixels forming the perimeter of the region, or the like, or by identifying all the pixels in the region.

The ROI detection module 54 can be represented by a set of different detectors, with a detector or detectors specific to each class of the set of classes. The class assigned by the classifier 52 at S106 determines which detector(s) is used for identifying ROIs. Thus for example, where a 'portrait' class is assigned, the ROI detection module uses a detector specific to detection of faces and return a list of regions that are detected as corresponding to faces. Similarly, for an image categorized as 'pets,' the ROI detector detects ROIs containing an animal face, and in a 'flower' classed image, a detail of the flower or the flower itself may be returned as an ROI.

In one embodiment, a ROI may be computed by assigning to each pixel of the original image (or reduced resolution version thereof), a probability that the pixel belongs to the object class assigned at S106. A class probability map can then be generated for the original image 12, in which each pixel of the map contains the probability that the corresponding image pixel belongs to the selected object class. Thereafter, a group of contiguous pixels which meet a threshold probability of being in the class can be identified. Threshold size and or shape requirements can be applied to eliminate regions which are too small or too thin for consideration. Further details of such a method for identifying an ROI are described, for example, in above-mentioned U.S. application Ser. No. 12/033,434 by Gabriela Czurka, incorporated by reference.

Alternatively, the detection task can be achieved with a standard approach based on visual attention and saliency maps (see, for example, U.S. Pat. No. 7,034,848, entitled SYSTEM AND METHOD FOR AUTOMATICALLY CROPPING GRAPHICAL IMAGES, by Sobol, U.S. Pat. No. 6,545,743, entitled PRODUCING AN IMAGE OF A PORTION OF A PHOTOGRAPHIC IMAGE ONTO A RECEIVER USING A DIGITAL IMAGE OF THE PHOTOGRAPHIC IMAGE, by Luo, et al.; U.S. Pub. No. 2006/0072847, entitled SYSTEM FOR AUTOMATIC IMAGE CROPPING BASED ON IMAGE SALIENCY, by Chor, et al., the disclosure of which is incorporated herein by reference.

Other methods specific to detection of faces may be employed, for example, when the class is a portrait class. For example, for 'portraits' the ROI extraction module may be implemented with a face detector based on the Viola-Jones technique. See, for example, P. Viola, M. Jones, "Robust Real-time Object Detection", $2^{nd}$ International Workshop on statistical and computational theories of vision: modeling, learning, computing and sampling, Vancouver, Canada, Jul. 13, 2001. This method uses simple Haar-like features (so called because they are computed similar to the coefficients in Haar wavelet transforms) and a cascade of boosted tree classifiers as a statistical model. Further details on the Viola-Jones method can be found at http://opencvlibrary.sourceforge.net/FaceDetection.

Other face detection techniques which may be employed are disclosed, for example, in U.S. Pat. Nos. 6,009,209 and 6,278,491, the disclosures of which are incorporated herein by reference in their entireties.

The output of this step is a list of candidate ROIs and their locations, which may be stored in data memory 48.

Figure 5:
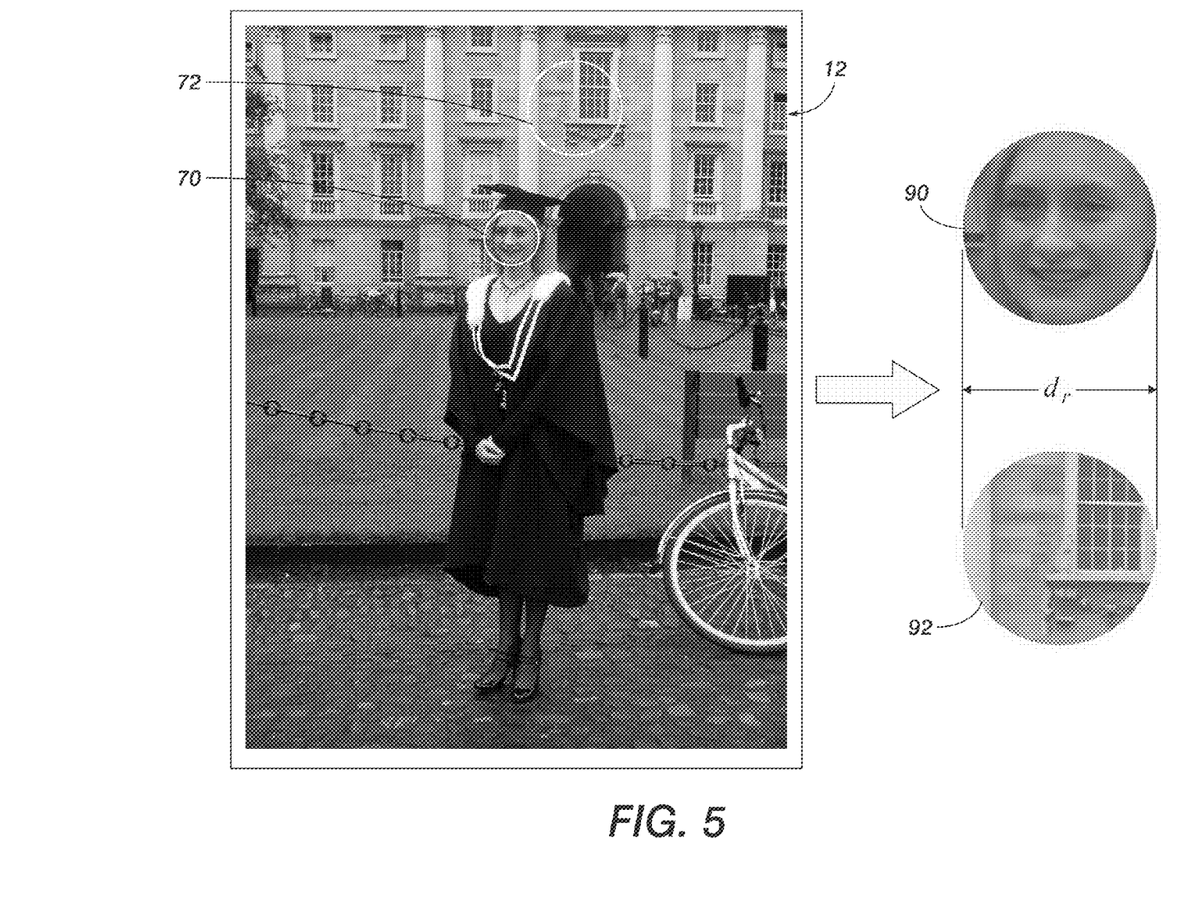
FIG. 5 illustrates the identification of regions of interest in an original image and the generation of insets therefrom in the exemplary method of FIG. 2.

FIG. 5 illustrates an exemplary image in which two ROIs 70, 72 have been identified using face detection based on the Viola-Jones technique. As can be seen, ROI 72 is a false positive for the class 'portrait.'

ROLI Detection

At S110, the image 12 is processed to detect and localize one or more regions of low interest (ROLI) 22, 30. In one embodiment, it is assumed that a region of low interest is likely to fall within a peripheral region 74 of the original image (FIG. 6), i.e., in a border region adjacent the perimeter of the image, which frames an interior region 76. For example, the rule of thirds is employed for determining ROLIs. In this embodiment, it is assumed that the peripheral region 74 of the picture is more likely to contain less information than the central region or the regions adjacent to the four points 78 specified by the rule of thirds. The peripheral region 74 can thus defined outside this area. Subregions 80, 82 etc. of the peripheral region 74 are then evaluated for their level of interest (interest coefficient), according to predefined interest criteria. The interest coefficient may be subsequently used in selecting one or more of these low interest subregion(s) as appropriate ROLIs 22, 30 for the inset(s).

Figure 6:
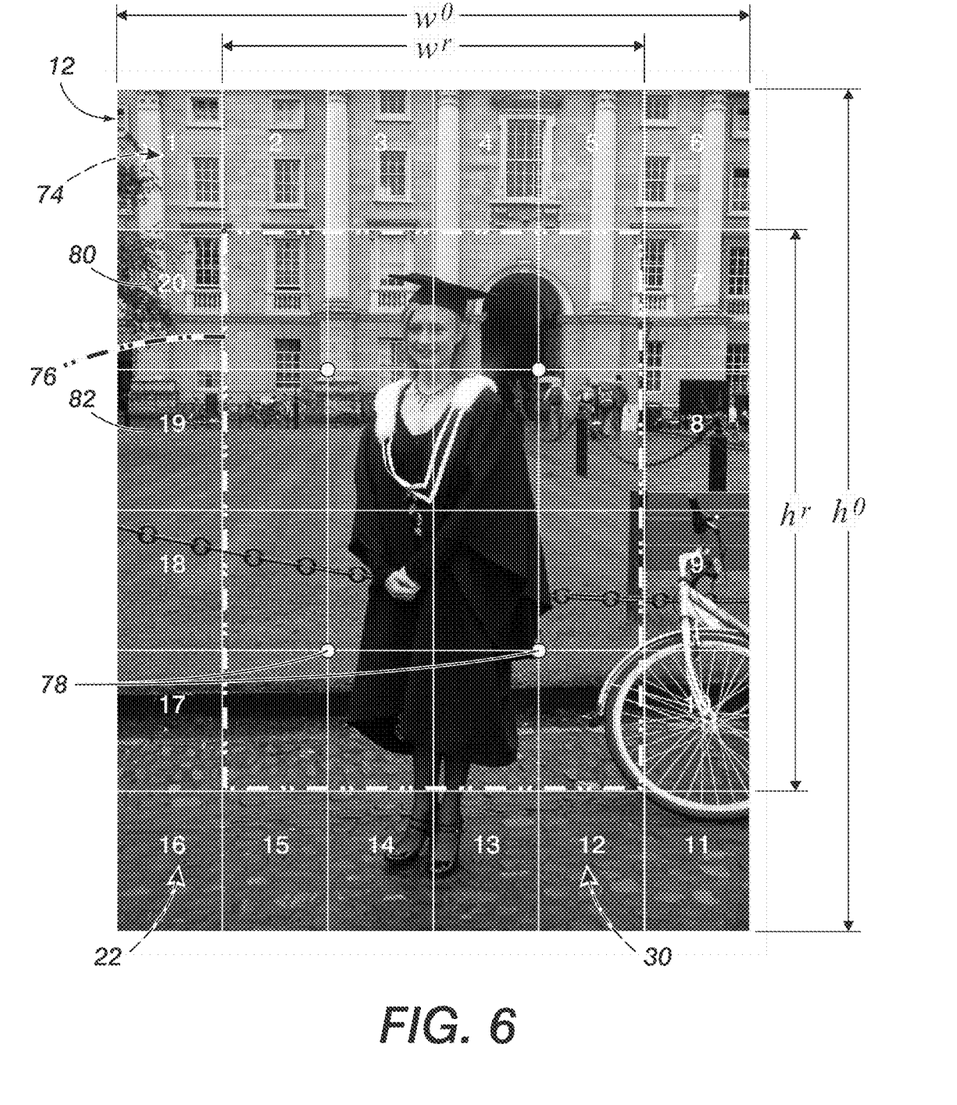
FIG. 6 illustrates the subdivision of a border region of the original image into subregions for identifying candidate regions of low interest in the exemplary method of FIG. 2.

Various methods can be applied to define and partition the peripheral region 74 of the image and compute a local interest coefficient for each subregion. In one embodiment, the method includes the following steps:

A rectangular region 76 of width and height $w^r$ and $h^r$ is chosen in the image according to the following criteria:

Its center of mass coincides with the center of the image, $$\frac{h^o}{w^o} = \frac{h^r}{w^r}, \text{ and } \frac{h^o \cdot w^o}{h^r \cdot w^r} = k.$$

The value of k may be selected, e.g., based on experimentation, to reduce or enlarge the peripheral region 74. In one embodiment, k<9 to guarantee that the four points 78 specified by the rule of thirds are inside the rectangular region 76. For example, k may be at least 1.5 or at least 2 and may be up to about 3. The entire area of the image, excluding the interior rectangle 76, is then considered as the peripheral region 74. The peripheral region is subdivided into subregions 80, 82 etc. of equal size, such as from about 8 to 36 subregions, e.g., 20. These subregions are candidate ROLIs for the insets. For each candidate ROLI, an interest coefficient indicating the interest of the region is computed.

In the illustrated embodiment, k is set to 2.25. The peripheral region is then partitioned into 20 candidate ROLIs with same size equal to $(h^o \cdot w^o)/36$ as shown in FIG. 6.

Figure 7:
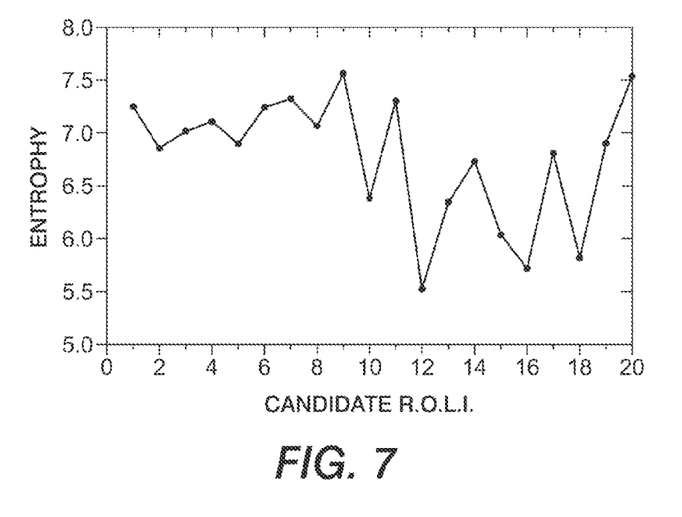
FIG. 7 illustrates a plot of entropy vs. candidate region of low interest for the subregions identified by number in FIG. 6.

The interest coefficient may be computed by evaluating entropy $l_i$ of each candidate ROLI 80, 82, etc. in the luminance (Y) channel. Here, entropy is a measure of the level of similarity of the luminance values of the pixels in the candidate ROLI. The theory is that as entropy decreases, the pixels are more similar in value, suggesting that the region is of low interest. Exemplary entropy values for the candidate ROLIs in FIG. 6 are shown in FIG. 7. Entropy $l_i$ is a statistical measure of randomness that can be used to characterize the texture of the input image or portion thereof. In the present case, entropy can be defined as $-\text{sum}(p.*\log 2(p))$ where p represents the histogram counts returned for each candidate ROLI.

The interest coefficient may be the entropy value obtained or may be a function thereof, such as ratio, e.g., the ratio of the entropy of a subregion to the maximum entropy of all subregions.

The output of this step is a list of candidate ROLIs (subregions) and their interest coefficients, which may be stored in memory 48.

Inset Extraction

Step S112 may include three substeps: inset selection, inset cropping, and inset resizing. In particular, one or more of the identified ROI's is selected, either manually or automatically. In an automated mode, the insets are extracted from the input image based on the ROI list $\{r=1, \ldots, R\}$. Where there is more than a limited number of ROIs on the list, the system, such as ROI detector, may limit the number of ROIs, e.g., based on selection criteria, such as one or more of 1) the probability, output by the ROI detector, that the ROI includes an object which is likely to be of interest for the image class; 2) its dimensions; and 3) its aesthetic properties (color combination, horizontal vertical forces, shadows/highlight, etc.). For example, if two faces are identified for the portrait class with roughly equal probabilities of being a face, the system may select the face having the larger dimensions in the original image.

Where manual selection is employed, one or more of the ROIs 70, 72 may be presented to the user for selection, e.g., the user is requested to select an ROI by clicking on or highlighting a selected area of the image. For example, the ROIs 70, 72 forming the list may be highlighted with circles, as shown in FIG. 5.

Having selected an ROI 70, 72, a suitably shaped crop from the selected ROI is generated. The crop may encompass less than all the ROI, for example, where a designated crop pattern is different from that of the ROI shape or where the ROI is larger than a predetermined threshold size. The crop may be resized accordingly to an appropriate scale factor. For example, the crop is enlarged to a specified inset diameter or other dimension. For example, as shown in FIG. 5, circular crops 90, 92 are generated which include at least a predominant portion of the respective ROI 70, 72 and are resized to a common predefined diameter $d_r$. Alternatively, the diameter $d_r$ of the circular pattern 90, 92 may have the same diameter as the ROI in the original image.

Different crop patterns can be chosen for the insets e.g. square, circle, elliptical, etc. For faces, a circular or elliptical pattern may be automatically selected as being particularly suited for face ovals. The final image layout is created in the inset applying step (S114) by placing the crop (s) 90, 92 as insets 16, 26 in the designated peripheral area of the image.

Inset Application

At S114, the inset 16, 26 is applied to the image in a ROLI 22, 30. By "apply" it is meant any process in which the inset image 14 is caused to include the inset, e.g., overlaying, image data substitution, etc. In one embodiment, this includes substituting image data in the inset for image data in the ROLI. Due to differences in sizes and shapes of the inset and ROLI, and also the ROLI's proximity to the border of the image, the inset need not completely encompass the ROLI, however, at least a portion of the inset is located in the ROLI.

In general, it is desirable to place the inset far from the ROI that it represents and in a low interest ROLI. Thus, the selection of an ROLI for a particular ROI may be based on the ROLI's interest coefficient and its proximity to the ROI. For example, in one embodiment, an ROLI is chosen as a candidate position for each inset according to the following criteria:

$$\max_j \frac{d(r_i, n_j)}{l_j + \Delta l}$$

where d is a value between 0 and 1 proportional to the Euclidean distance between the i-th ROI and the j-th ROLI, $l_j$, is the entropy of the j-th ROLI, and $\Delta l$ is a constant value added to avoid singularities.

In other embodiments, the candidate ROLI(s) of lowest entropy may be selected for the ROLI(s), such as the subregions numbered 12, 15, 16, and 18, without reference to their proximity to the ROI.

Prior to applying the inset, the original mage 12 may be downscaled using the coefficient s. The dimension $d_r$ may then be checked against the new dimensions of the rescaled image. In the event that it does not fit substantially within the ROLI or within adjacent ROLIs, it may be downscaled accordingly.

At S116, the inset image 14 is output. In one embodiment, the inset image is sent in digital form to the user for display on the user's screen. In the exemplary inset shown in FIG. 3, the original image has been resized with a scale factor s equal to 4 and two insets 16, 26 incorporated to form the inset image 14.

At S118, the user may confirm the selected ROI(s) and/or their positions, e.g., by clicking on an 'accept' button in the web browser. If the user is presented with more than one inset 16, 26, the user may decide to accept fewer than all the insets and chose to delete the rest e.g., false positive 26). The user may chose to move one or more of the selected insets. For example, the web browser may provide a drag and drop feature whereby a user can move the inset 16 to a new position. Alternatively or additionally, the user may be permitted to assign the position of a deleted inset as the new position of the inset.

Figure 8:
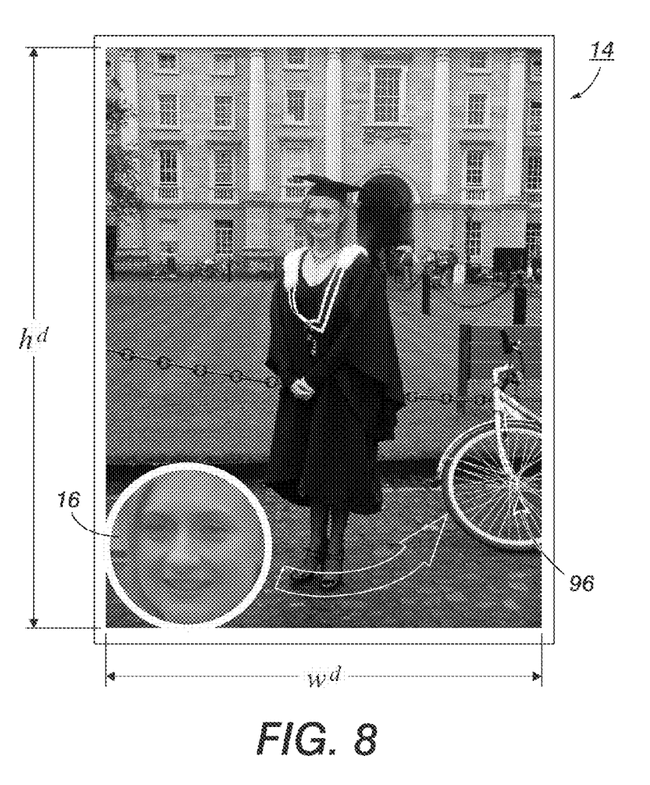
FIG. 8 illustrates modification to the inset image of FIG. 3 in response to a user's modification.

For example, as illustrated in FIG. 8, the user has selected to delete the inset 26. The user has also selected to modify the position the inset 16 by manually moving the inset towards a region 96 of high entropy but low composition value, rather than placing it in the position of the deleted inset 26.

In one embodiment, the inset image 14 is incorporated into a document, such as a newsletter, journal article, newspaper article, direct mail letter, advertisement, or the like, and may be rendered in tangible media, for example by printing, or displayed, e.g., on a screen. Optionally, at S120, the image or document is printed.

The insetting system 10 and method find application in a variety of contexts, including variable data printing applications such as 1 to 1 personalization and direct mail marketing. Thus, for example, in a direct mail marketing application, the class/ROI detector may be selected based on the recipient in order that an automatically generated inset reflects the expected preferences of the recipient. In a simple example, the gender of the recipient may be taken into account, for example, by inputting a preference for a female face when the recipient is male, or vice versa. This ability to tailor the content of the inset to the intended recipient can be readily incorporated into a variable data workflow, so that the enhancement or management operations are handled in a more context sensitive fashion. Thus, for example, the same original image can be used to generate a plurality of different inset images, each tailored to a different content preference.

Other applications of the system and method include image and document asset management or document image/photograph set visualization.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of forming an inset image comprising:
receiving an original image;
automatically identifying a region of interest in the original image;
generating an inset based on the region of interest;
automatically identifying a region of low interest in the original image;
applying the inset on the region of low interest to form an inset image, wherein the region of interest is scaled differently from the inset in the inset image; and
outputting the inset image.

2. The method of claim 1, wherein the automatic identification of the region of interest comprises applying a detector trained to detect regions of interest for a class of images.

3. The method of claim 1, wherein the automatic identification of the region of interest comprises assigning a class to the original image from a plurality of predefined classes and automatically identifying regions of interest based on the class.

4. The method of claim 3, wherein the classes are selected from the group consisting of Portrait, Close-Up Faces, Golf, Pets, Flowers, Snow, Mountains, Beach, Urban-day, Sunrise-Sunset, Urban-night, and Crowd classes.

5. The method of claim 3, wherein the assigning of a class to the image comprises automatically classifying the image into one of the plurality of predefined classes with an automatic classifier.

6. The method of claim 1, wherein the automatic identification of the region of low interest in the original image comprises subdividing a region of the image into subregions and selecting at least one of the subregions as the region of low interest.

7. The method of claim 1, wherein the selecting includes, for each of the subregions, determining an interest coefficient for the subregion, and basing the selection at least in part on the interest coefficient.

8. The method of claim 7, wherein the interest coefficient is based on the entropy of the subregion, and the method comprises determining the entropy for each of the subregions.

9. The method of claim 6, wherein the region to be subdivided comprises a border region of the original image and excludes an interior region.

10. The method of claim 1, wherein the automatic identification of the region of low interest in the original image comprises identifying a plurality of candidate regions of low interest and selecting one of the candidate regions based on at least one of an interest coefficient and a proximity to the region of interest.

11. The method of claim 1, wherein the generating of the inset based on the region of interest comprises generating a crop based on the region of interest.

12. The method of claim 11, further comprising applying a scaling factor to the crop.

13. The method of claim 1, further comprising scaling the original image with a scaling factor.

14. The method of claim 1, further comprising scaling the inset with a different scaling factor from the original image's scaling factor.

15. The method of claim 1, wherein in the inset image, the inset is larger, in a dimension, than the region of interest on which it is based.

16. The method of claim 1, wherein the outputting comprises presenting the inset image to a user and the method further comprises modifying the inset image based on at least one of:
the user's selection of the inset from a plurality of insets; and
the user's selection of a new position for the inset.

17. The method of claim 1, wherein the outputting comprises printing the image.

18. A computer program product comprising a non-transitory recording medium which stores instructions, which, when executed by a computer, perform the method of claim 1.

19. A computer system comprising memory which stores instructions for performing the method of claim 1 and a processor, in communication with the memory, for executing the instructions.

20. A system for forming an inset image comprising:
a classifier for automatically assigning a class to an original image based on content, the class being selected from a plurality of classes;
a first detector for automatically identifying a region of interest in the original image based on the assigned class;
a second detector for identifying a region of low interest in the original image; and
an inset generator for generating an inset based on the region of interest;
an inset applier for applying the inset on the region of low interest in the original image or an image generated therefrom to form an inset image; and
optionally, an inset modifier for modifying the inset image based on a user's selected modifications to the inset image.

21. A method of forming an inset image comprising:
automatically assigning an object class to an original image from a plurality of predefined object classes;
automatically identifying a region of interest in the original image based on the assigned object class;
generating an inset based on the region of interest;
automatically identifying a region of low interest in the original image;
applying the inset on the region of low interest to form an inset image; and
scaling at least one of the original image and the inset such that the region of interest is scaled differently from the inset in the inset image.

* * * * *